United States Patent
Kees et al.

(10) Patent No.: US 9,836,972 B2
(45) Date of Patent: Dec. 5, 2017

(54) AID FOR INDUCTIVE BATTERY CHARGING OF A MOTOR VEHICLE

(71) Applicant: FORD GLOBAL TECHNOLOGIES, LLC, Dearborn, MI (US)

(72) Inventors: Donatus Andreas Josephine Kees, Billericay (GB); Anthemios Philemon Petridis, Bishop's Stortford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 51 days.

(21) Appl. No.: 14/466,572

(22) Filed: Aug. 22, 2014

(65) Prior Publication Data

US 2015/0061897 A1    Mar. 5, 2015

(30) Foreign Application Priority Data

Aug. 30, 2013  (GB) .................................. 1315504.9
Apr. 30, 2014  (GB) .................................. 1407621.0

(51) Int. Cl.
  *B60W 20/00*   (2016.01)
  *G08G 1/0968*  (2006.01)
  (Continued)

(52) U.S. Cl.
  CPC .......... *G08G 1/0968* (2013.01); *B60L 3/0023* (2013.01); *B60L 11/123* (2013.01); *B60L 11/14* (2013.01); *B60L 11/182* (2013.01); *B60L 11/1805* (2013.01); *B60L 11/1824* (2013.01); *B60L 11/1829* (2013.01); *B60L 11/1833* (2013.01); *B60L 11/1835* (2013.01); *B60L 11/1846* (2013.01); *B60L 11/1848* (2013.01); *B60L 11/1861* (2013.01); *B60L 11/18* (2013.01); *B60L 2230/16* (2013.01); *B60L 2240/62* (2013.01); *B60L 2240/667* (2013.01); *B60L 2240/80* (2013.01);
  (Continued)

(58) Field of Classification Search
  CPC .............................. B60L 11/18; G08G 1/0968
  USPC ......... 340/932.2; 701/22; 320/104, 108, 109
  See application file for complete search history.

(56) References Cited

U.S. PATENT DOCUMENTS 5,821,731 A    10/1998  Kuki et al.
7,999,506 B1    8/2011  Hollar et al.
(Continued)

FOREIGN PATENT DOCUMENTS

JP    2011215703 A    10/2011

*Primary Examiner* — Brent Swarthout
(74) *Attorney, Agent, or Firm* — David B. Kelley; Brooks Kushman P.C.

(57) ABSTRACT

A method for assisting with the positioning of a motor vehicle for inductive charging of a battery of the motor vehicle comprises reading a number plate associated with the motor vehicle using the number plate information to produce a location on the vehicle of a vehicle inductive coupling point (VICP) with reference to at least one reference point on the motor vehicle, comparing a predicted current position of the VICP to a fixed inductive coupling point (ICP) located in or on a road surface upon which the motor vehicle is to be positioned, and providing feedback to one of the driver and the motor vehicle indicative of the required action required to produce alignment of the VICP with the ICP. The method may further comprise energizing the ICP to charge the battery of the motor vehicle when the VICP is predicted to be aligned with the ICP.

9 Claims, 5 Drawing Sheets

(51) Int. Cl.
*B60L 3/00* (2006.01)
*B60L 11/12* (2006.01)
*B60L 11/14* (2006.01)
*B60L 11/18* (2006.01)

(52) U.S. Cl.
CPC ....... *B60L 2250/10* (2013.01); *B60L 2250/16* (2013.01); *B60L 2260/44* (2013.01); *Y02T 10/6217* (2013.01); *Y02T 10/7005* (2013.01); *Y02T 10/705* (2013.01); *Y02T 10/7044* (2013.01); *Y02T 10/7077* (2013.01); *Y02T 10/7088* (2013.01); *Y02T 10/7291* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/16* (2013.01); *Y02T 90/162* (2013.01); *Y02T 90/163* (2013.01); *Y02T 90/168* (2013.01); *Y02T 90/169* (2013.01); *Y04S 30/12* (2013.01); *Y04S 30/14* (2013.01)

(56) References Cited

U.S. PATENT DOCUMENTS

| | | | |
|---|---|---|---|
| 2010/0230197 A1* | 9/2010 | Ortmann | B60L 11/1818 180/168 |
| 2012/0029750 A1* | 2/2012 | Ortmann | B60L 11/1818 701/22 |
| 2012/0095617 A1* | 4/2012 | Martin | B60L 11/1833 701/1 |
| 2012/0187773 A1 | 7/2012 | Wechlin et al. | |
| 2012/0203410 A1* | 8/2012 | Wechlin | B60L 11/182 701/22 |
| 2012/0206098 A1 | 8/2012 | Kim | |
| 2013/0088093 A1* | 4/2013 | Aschenbroich | B60L 11/1816 307/112 |
| 2014/0132208 A1* | 5/2014 | Fisher | H02J 7/025 320/108 |
| 2015/0009047 A1* | 1/2015 | Ashkenazi | G08G 1/144 340/932.2 |

* cited by examiner

AID FOR INDUCTIVE BATTERY CHARGING OF A MOTOR VEHICLE

CROSS-REFERENCE TO RELATED APPLICATIONS

This application claims foreign priority benefits under 35 U.S.C. §119(a)-(d) to GB 1315504.9, filed Aug. 30, 2013, and GB 1407621.0, filed Apr. 30, 2014, which are hereby incorporated by reference in their entirety.

TECHNICAL FIELD

This disclosure relates to a method to aid inductive battery charging of a motor vehicle having a battery that requires recharging and in particular to a method of assisting with the positioning of such a motor vehicle for inductive charging of the battery.

BACKGROUND

Electric vehicles such as Plug-In Electric Vehicles (PHEV), Battery Electric Vehicles (BEV) and Range Extended Electric Vehicles (REV) suffer from limited electric driving range due to the limited energy storage capacity of current electric storage and propulsion batteries (traction batteries). The use of charging leads is unpopular with users of such vehicles as they are time consuming to connect and disconnect and must be stored on the vehicle thereby taking up valuable storage space. In addition, corrosion of the plug and socket connection will increase the resistance between the plug and the socket thereby reducing charging efficiency.

Therefore in order to provide an extended driving range and simplify the recharging process, it is desirable to obviate the need to plug in a charging cord. It has therefore been proposed to use inductive charging and mount an inductive pad or inductive coupling point (VICP) to the underside of the vehicle and another fixed to the ground such that energy and information can be transferred from the fixed inductive coupling point (ICP) to the vehicle to recharge the electric battery.

Inductive charging sometimes known as "wireless charging" uses an electromagnetic field to transfer energy between two objects. Energy is sent through an inductive coupling to an electrical device (inductive coupling point), which then uses the transferred energy to charge one or more batteries on the vehicle.

An induction charger typically uses an induction coil to create an alternating electromagnetic field from within a fixed charging base station (ICP) and a second induction coil in the VICP takes power from the electromagnetic field and converts it back into electrical current to charge the battery or batteries.

A problem with such inductive coupling points is that many drivers have difficulty accurately maneuvering and positioning a vehicle onto a fixed inductive coupling point such as a fixed charging coil, especially if the charging coil is obscured by the vehicle which is the case with a ground mounted inductive coupling point (ICP).

If accurate alignment is not achieved between the fixed ICP and the VICP, large losses will result primarily due to the large air gap. These losses will result in an increased electricity cost per battery charge and also in an excessively long battery charging time.

SUMMARY

It is an object of the invention to provide a method of assisting with the positioning of a motor vehicle relative to a fixed inductive charging point so as to maximize charging efficiency and minimize battery charging time.

According to a first aspect of the invention there is provided a method for assisting with the positioning of a motor vehicle having a battery and a single vehicle mounted inductive coupling point relative to a fixed ground mounted inductive coupling point used to charge the battery via inductive coupling with the single vehicle mounted inductive coupling point wherein the method comprises using a vehicle recognition system to establish the identity of the motor vehicle, using the identity of the motor vehicle to obtain the location on the vehicle of the single vehicle mounted inductive coupling point with reference to at least one reference point on the motor vehicle, using the location of the single vehicle mounted inductive coupling point on the motor vehicle and a known location of the fixed ground mounted inductive coupling point to provide guidance to at least one of the driver and a control system of the motor vehicle for maneuvering the motor vehicle to align the single vehicle mounted inductive coupling point with the fixed ground mounted inductive coupling point.

Providing guidance to at least one of the driver and a control system of the motor vehicle may include comparing a predicted current position of the single vehicle mounted inductive coupling point with the known location of the fixed ground mounted inductive coupling point and producing instructions indicative of the action required to align the single vehicle mounted inductive coupling point with the fixed ground mounted inductive coupling point based upon the difference between the predicted current position of the single vehicle mounted inductive coupling point and the known location of the fixed ground mounted inductive coupling point.

Guidance may be provided to the driver of the motor vehicle by displaying on one of a remote display screen and a vehicle mounted display screen the action required by the driver in order to maneuver the motor vehicle so as to bring the single vehicle mounted inductive coupling point into alignment with the fixed ground mounted inductive coupling point.

The action required by the driver may be provided in the form of at least one of graphical directions provided via the display screen and written instructions provided via the display screen.

Alternatively, guidance may be provided to the control system of the motor vehicle by communicating data to the control system of the motor vehicle indicative of the action required in order to maneuver the motor vehicle so as to bring the single vehicle mounted inductive coupling point into alignment with the fixed ground mounted inductive coupling point.

The control system of the motor vehicle may use the communicated data to control at least the steering of the motor vehicle.

The control system of the motor vehicle may use the communicated data to control an electric motor of the motor vehicle to move the motor vehicle in one of a forward and a reverse direction.

The vehicle recognition system may be a number plate recognition system used to identify a registration mark of the motor vehicle and the identity of the motor vehicle is a make and model of the motor vehicle associated with the registration mark of the motor vehicle.

According to a second aspect of the invention there is provided an apparatus for assisting with the positioning of a motor vehicle having a battery and a single vehicle mounted inductive coupling point relative to a fixed ground mounted inductive coupling point used to charge the battery via inductive coupling with the single vehicle mounted inductive coupling point wherein the apparatus comprises a charging module for controlling the supply of power to the fixed ground mounted inductive coupling point and for providing assistance with the positioning of the motor vehicle, the charging module including a vehicle recognition system to establish the identity of the motor vehicle, at least one sensor to establish the current location of at least one reference point on the motor vehicle and an electronic processing system to obtain the location on the motor vehicle of the single vehicle mounted inductive coupling point with reference to the at least one reference point on the motor vehicle from the identity of the motor vehicle and determine the action required to maneuver the motor vehicle from its current position to a required position in which the single vehicle mounted inductive coupling point is aligned with a known location of the fixed ground mounted inductive coupling point for efficient inductive coupling between the fixed ground mounted inductive coupling point and the single vehicle mounted inductive coupling point and provide guidance to at least one of the driver and a control system of the motor vehicle for maneuvering the motor vehicle so as to align the single vehicle mounted inductive coupling point with the fixed ground mounted inductive coupling point.

The electronic processing system may communicate with at least one remote database in order to establish the location of the single vehicle mounted inductive coupling point on the motor vehicle with reference to said at least one reference point on the motor vehicle.

The apparatus may further comprise a display screen to display the actions required by the driver to maneuver the motor vehicle so as to bring the single vehicle mounted inductive coupling point into alignment with the fixed ground mounted inductive coupling point.

The control system on the motor vehicle may be operable to control at least the steering of the motor vehicle and may include a communication device for receiving communicated data from the charging module indicative of the actions required by the control system to maneuver the motor vehicle so as to bring the single vehicle mounted inductive coupling point into alignment with the fixed ground mounted inductive coupling point.

The control system on the motor vehicle may be further operable to control an electric motor of the motor vehicle to move the motor vehicle in one of a forward and a reverse direction.

The vehicle recognition system may be a number plate recognition system used to identify a registration mark of the motor vehicle and the identity of the motor vehicle is a make and model of the motor vehicle associated with the registration mark of the motor vehicle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
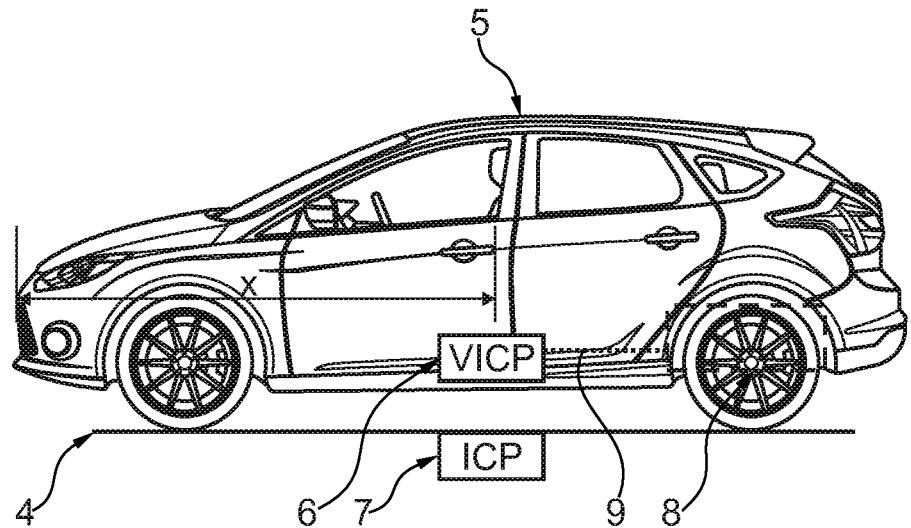
FIGS. 1 and 2 are respective side and rear views of a motor vehicle showing the location of a vehicle mounted inductive coupling point and a fixed inductive coupling point when the motor vehicle is correctly positioned for inductive charging.
Figure 2:
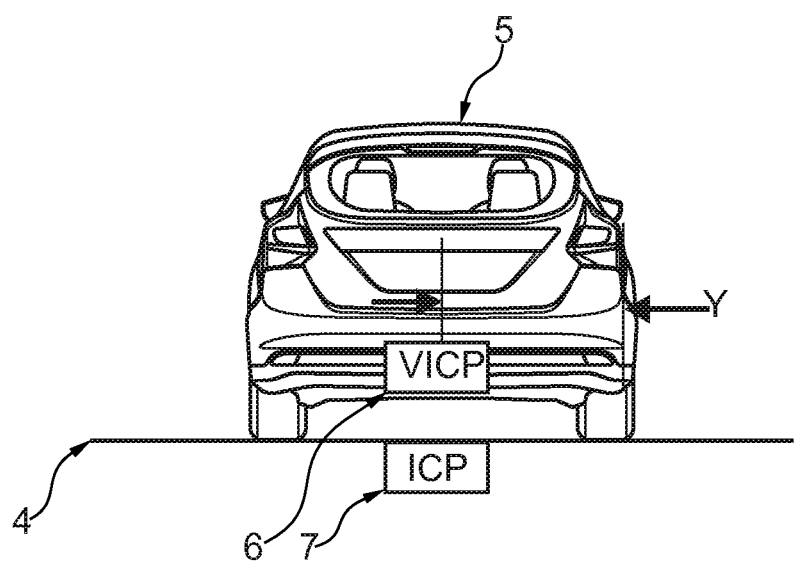

With reference to FIGS. 1 and 2 there is shown a motor vehicle 5 having a vehicle mounted inductive coupling point (VICP) 6 located on a longitudinal center line of the motor vehicle 5 at a predefined distance "x" from a front of the motor vehicle 5 which constitutes a reference point from which the position of the VICP 6 is measured.

The distance "x" is stored as part of general information regarding the motor vehicle 5 on a database (not shown) along with other relevant information regarding the motor vehicle 5 and is indexed by means of a registration mark appearing on the motor vehicle 5 as a number plate (not shown).

The motor vehicle 5 is resting on a road or floor 4 to which is mounted a fixed inductive coupling point (ICP) 7. The ICP 7 may be mounted on the surface of the road/floor 4 or may be mounted in the road/floor so as to be substantially flush mounted. The ICP 7 can be of any known type and is supplied with mains electric power that is used to charge a battery 8 (not shown on FIG. 2) of the motor vehicle 5 by inductive coupling with the VICP 6. The battery 8 is electrically connected to the VICP 6 by one or more electrical conductors 9.

In the case of this example, knowledge of the registration mark of the motor vehicle 5 can be used to predict a longitudinal position of the VICP 6 and the transverse position of the VICP 6 is known because it is located on a central longitudinal axis of the motor vehicle 5. In other embodiments the VICP 6 may be mounted offset from the central longitudinal axis of the motor vehicle 5 in which case a distance "y" from one of the sides of the motor vehicle 5 acting as a lateral reference point would also need to be referenced in the data associated with the registration mark of the motor vehicle 5.

Figure 3:
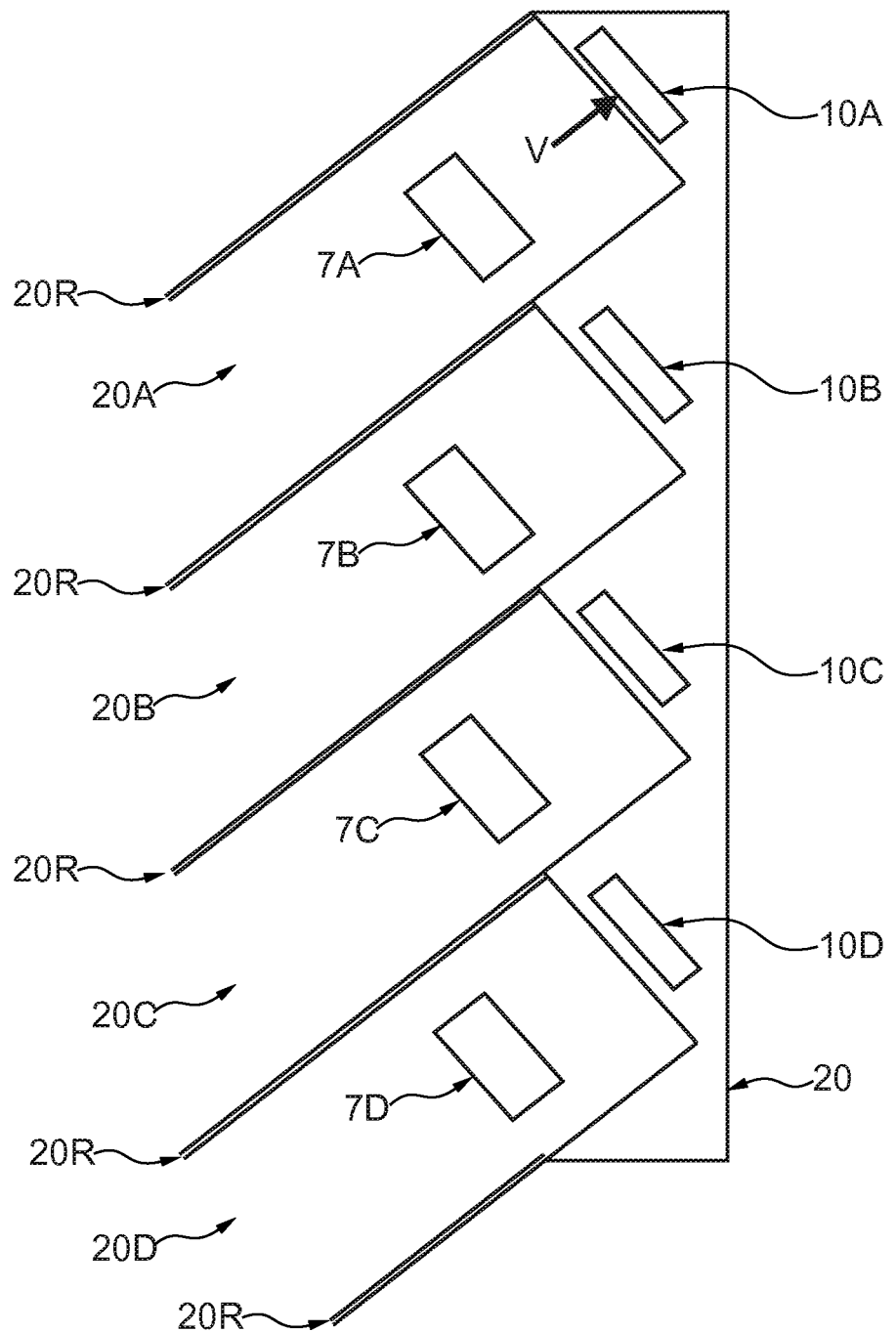
FIG. 3 is a schematic plan view of a motor vehicle charging station having four charging bays.

With reference to FIG. 3 there is shown a charging station 20 having in this case four charging bays 20A, 20B, 20C and 20D.

Each side of a respective charging bay 20A to 20D is defined by a marking or barrier and in this case elongate rails 20R are used to separate and define the edges of the charging bays 20A to 20D.

A respective ICP 7A to 7D is mounted in each bay 20A to 20D in a known location within the charging bay 20A to 20D. In the case of the example shown, each ICP 7A to 7D is centrally located between the boundary railings 20R and is positioned a known distance from a respective charging module referred to hereinafter as a Human Machine Interface Module (HMIM) 10A to 10D. Each HMIM 10A to 10D includes an electronic controller for controlling the supply of electrical power to the ICPs 7A to 7D and an electronic processing system (not shown) that is connected either wirelessly or via a wired/optic fiber connection to at least one remote database storing details of registration marks and the identity of the motor vehicle in terms of its make and model associated with each registration mark. The remote database may also store details of the position of the respective VICP 6 on the motor vehicle 5 with reference to at least one reference point. Alternatively a second remote database may be used to cross-reference vehicle make and model against VICP 6 location or each HMIM 10A to 10D could store within a local memory device a database cross-referencing vehicle make and model against VICP 6 location.

In the case of the example shown, the parking bays 20A to 20D are located so that the motor vehicle 5 can drive into them in a forward direction and the respective HMIM 10A to 10D is then located at the front of the motor vehicle 5. In other examples (not shown) the motor vehicle 5 must execute an "S" maneuver in order to enter the charging bay similar to the maneuver required to park a motor vehicle in a gap between two parked cars parked in a nose to tail fashion along the side of a road.

Figure 4:
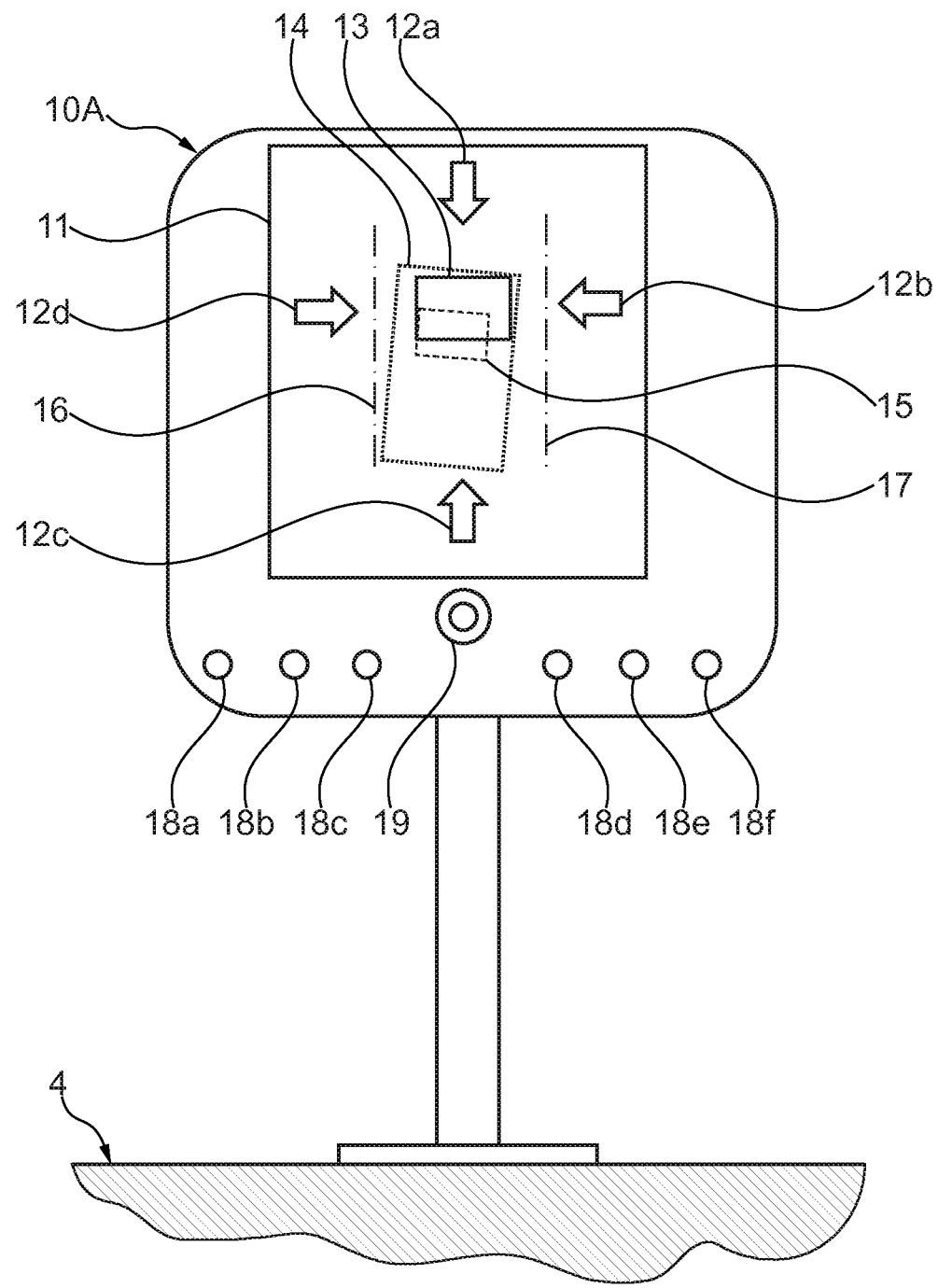
FIG. 4 is a front view in the direction of arrow 'V' on FIG. 3 of a human machine interface module forming part of one of the charging bays.

Referring now to FIG. 4 the HMIM 10A is shown in greater detail. It will be appreciated that all of the HMIMs 10A to 10D are of the same construction and functionality.

The HMIM 10A has a display screen 11 for displaying information to a driver of the motor vehicle 5 for use in accurately positioning the motor vehicle 5 in the charging bay 20A. The display screen 11 has four arrows 12a to 12d which can be illuminated to indicate a required direction of motion, a rectangular guide box indicating schematically the position of the ICP 7A, a pair of vertical broken lines 16, 17 indicating schematically the lateral edges of the charging bay 20A and a pair of rectangles 14, 15 indicating schematically predicted positions of the motor vehicle 5 and its VICP 6.

The arrow 12a is a graphical representation that the required action is for the vehicle to move in a reverse direction. The arrow 12b is a graphical representation that the required action is for the vehicle to move to the left. The arrow 12c is a graphical representation that the required action is for the vehicle to move in a forward direction. The arrow 12d is a graphical representation that the required action is for the vehicle to move to the right.

Although not shown, the HMIM 10A could include a feedback device such as a colored lamp or illuminated message to indicate that the motor vehicle 5 should be stopped. The feedback device could be used to halt the motor vehicle 5 well short of the required position for charging so that a sufficient distance remains for the motor vehicle 5 to execute any required maneuvers, the required maneuver, once determined, could then be displayed to the driver. The feedback device could also be used to tell the driver to stop when correct positioning has been obtained.

It will be appreciated that this example is not limited to the graphical display of such information and that less or more information could be provided or the information could be provided in word form such as "Go Forward", "Go Back", "Go Left", "Go Right" or any other such commands or a combination of words and graphical symbols.

The HMIM 10A also includes a number of sensors 18a to 18f which can be used to measure the distance of a reference point such as for example a front end of the motor vehicle from the HMIM 10A. In some embodiments the lateral position of the motor vehicle 5 can also be estimated relative to a reference point using the sensors 18a to 18f. For example if a vehicle is sensed to be approximately 2 m away from the HMIM 10A by the sensors 18a to 18d but more than 5 m away from the HMIM 10A by the sensors 18e and 18f then it can be concluded that the motor vehicle 5 is offset relative to the parking bay to the left. Alternatively, one or more lateral sensor (not shown) could be used to sense the position of a lateral reference point such as a wheel or door panel or sensors on the motor vehicle could be used to sense the lateral position.

The HMIM 10A also includes a vehicle recognition device such as a digital camera 19 capable of interpreting or reading a number plate of the motor vehicle 5 so as to determine the registration mark (registration number) of the motor vehicle 5. Various systems are known which are capable of reading a number plate and such systems are often referred to as number plate recognition systems.

The HMIM 10A is as previously referred to connected either wirelessly or by a cable to a source of vehicle information referenced by vehicle registration mark. After reading the number plate of a motor vehicle 5 located within the charging bay 20A, the HMIM 10A uses the acquired registration mark to obtain either from the same database but more likely from a separate database the position of the VCIM 6 on the respective motor vehicle 5 and may also acquire other data such as registered keeper details, preferred reference point height.

In some embodiments, the HMIM 10A is not fixed but includes a mechanism to adjust its height from the ground so as to suit the motor vehicle 5 located within the charging bay 20A. For example, the height could be adjusted so that the sensors 18a to 18f are positioned a predefined height above the ground that is best suited for sensing the position of a front end of the motor vehicle 5.

In operation the HMIM 10A reads the number plate of the motor vehicle 5 and uses this to determine the required positioning of the motor vehicle 5 in order for the VICP 6 to be correctly aligned with the ICP 7A and then assesses the current position of the motor vehicle 5 relative to the required position to bring the VICP 6 into alignment with the ICP 7. Information is then provided to the driver of the motor vehicle 5 via the display screen 11 to assist them in positioning the motor vehicle 5 in the required position.

When the motor vehicle 5 is located in the required position, the HMIM 10A activates or switches on the ICP 7A so that charging of the battery or batteries of the motor vehicle 5 are inductively charged via the VICP 6 of the motor vehicle 5.

The HMIM 10A monitors the charging process and may provide an indication to a driver of the motor vehicle 5 when charging is complete either via displaying a message on the display screen 11 or via a message sent to the driver via a mobile telephone or other portable communication device.

The registration mark of the motor vehicle 5 may also be used to verify that the motor vehicle 5 can be charged. For example, if the motor vehicle 5 is reported as stolen then charging would not be permitted. The registration mark could also be used with other means to effect payment for the electricity used to charge the motor vehicle 5 by acting as a partial identity check.

Figure 5:
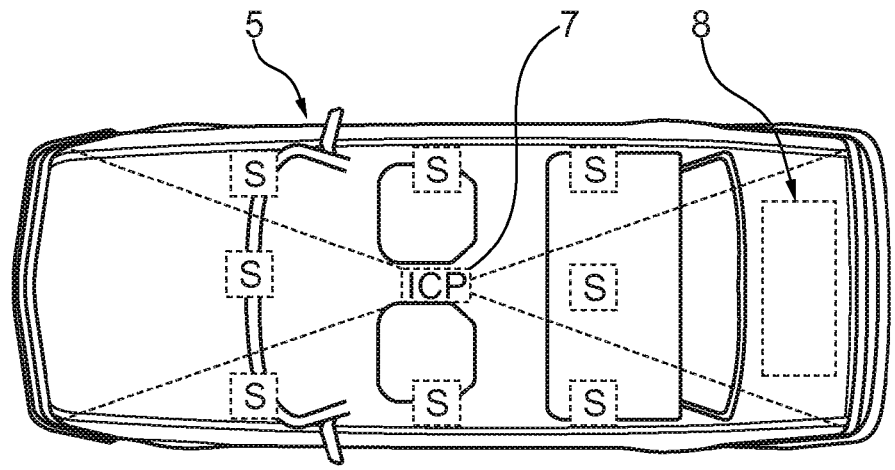
FIG. 5 is a plan view of a motor vehicle showing the position of the motor vehicle relative to a number of charging bay sensors when the motor vehicle is correctly positioned for charging.

With reference to FIG. 5 there is shown a plan view of the motor vehicle 5 having a battery 8 showing in dotted outline a number of sensors "S" mounted on the ground which could be used to supplement the sensors 18*a* to 18*f* located on the HMIM 10A. The sensors "S" are used to estimate the lateral position of the motor vehicle 5 and its orientation in the parking bay.

If the motor vehicle 5 is at an angle then one of the front sensors "S" would be exposed and provide a null output (no vehicle sensed) as would a rear sensor "S" on the opposite side of the motor vehicle 5. When correctly positioned, the battery 8 of the motor vehicle 5 is charged by inductive coupling between the VICP 6 and the ICP 7A.

In the above description the driver of the motor vehicle 5 performs the positioning of the motor vehicle 5 based solely on the guidance provided by the HMIM 10A but it will be appreciated that the driver could be responsible for only the fore-aft positioning of the motor vehicle 5 and the HMIM 10A could communicate with a control system on the motor vehicle 5 via a communication device employing a wireless link or other short range communication link (such as Bluetooth) so as to control a steering system of the motor vehicle 5 in a manner similar to that used for a parking assist system. It would also be possible for the fore-aft positioning of the motor vehicle 5 to be controlled by controlling the operation of an electric motor of the motor vehicle 5 that is driveably connected to at least one road wheel of the motor vehicle 5.

Figure 6:
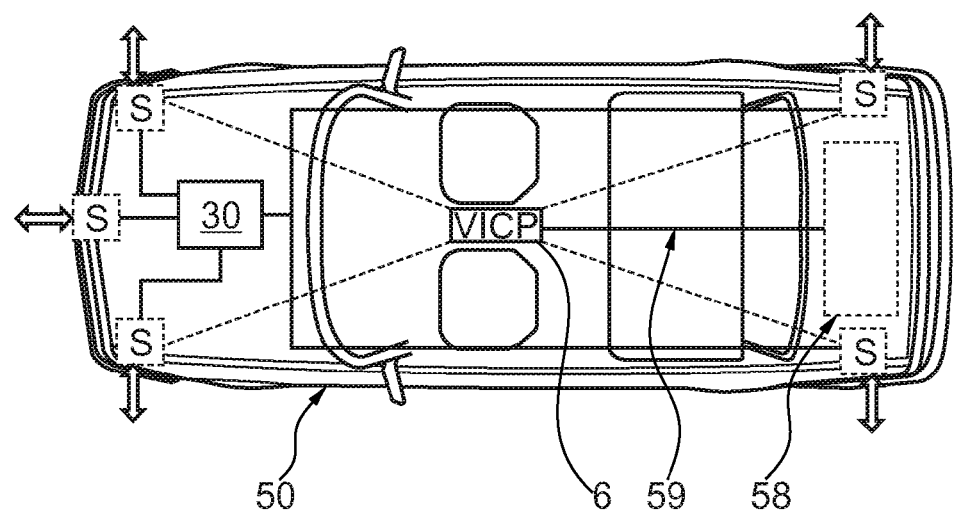
FIG. 6 is a plan view of a motor vehicle having a number of sensors to assist with positioning of the motor vehicle in a charging bay.

FIG. 6 shows a plan view of a motor vehicle 50 that includes a control system 30 for steering the motor vehicle 50 based upon the input from a number of sensors "S" located around the periphery of the motor vehicle 50. The motor vehicle 50 has a battery 58 that requires charging and is connected to the VICP 6 via one or more electrical cables 59.

With such an embodiment the HMIM 10A as before reads the number plate of the motor vehicle 50 and determines a required position for the motor vehicle 50 in order for the VICP 6 of the motor vehicle 50 to be correctly aligned with the fixed ICP 7A (not shown on FIG. 6).

However, in this case each charging bay 20A to 20D is bounded on both sides by a continuous partition and a solid end partition located at the HMIM 10A end of the respective charging bay 20A. The solid end partition could be formed by the HMIM 10A. In the case of this embodiment, no sensors are required on the HMIM 10A. They are all located on the motor vehicle 50. The HMIM 10A has a communication device to enable it to communicate wirelessly or in some other manner to provide information as to the distance of the front mounted sensor "S" from the solid end partition required to align the VICP 6 with the ICP 7A and the distance between at least one of the left hand side and right side of the motor vehicle 50 required from the corresponding continuous side partitions.

The control system 30 is then operable to steer the motor vehicle 50 to meet the required side distance(s) based upon feedback provided from the side mounted sensors "S".

The driver may control the fore-aft position of the motor vehicle 50 using feedback from the display screen 11 of HMIM 10A, a display screen within the motor vehicle 50 or automatically by the control system 30 using the front mounted sensor "S" and an electric motor (not shown) of the motor vehicle 50 driveably connected to at least one road wheel of the motor vehicle 50.

Figure 7:
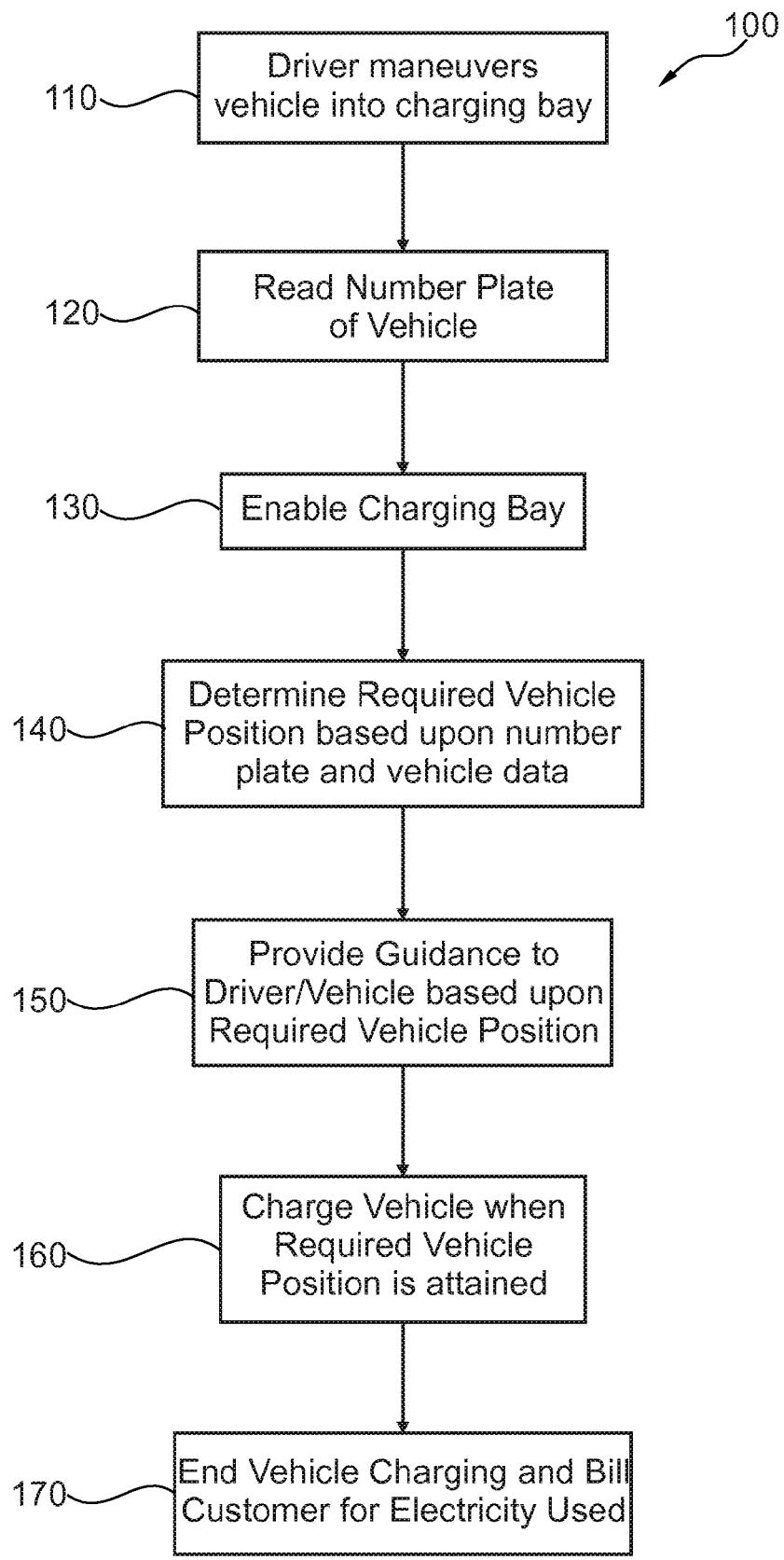
FIG. 7 is a high level flow chart of a method of assisting with the positioning of a motor vehicle for inductive battery charging.

With reference to FIG. 7 there is shown a method 100 of assisting with the positioning of a motor vehicle such as the motor vehicle 5 or the motor vehicle 50 for inductive battery charging.

The method starts in box 110 with the driver of the motor vehicle maneuvering the motor vehicle into a charging bay such as one of the charging bays 20A to 20D. The method advances to box 120 where a number plate of the motor vehicle is read so as to obtain information regarding the motor vehicle including details regarding the location on the motor vehicle of a vehicle mounted inductive coupling point, such as the VICP 6, for use in guiding the motor vehicle so as to align the VICP 6 with a fixed inductive coupling point, such as the ICP 7. It will be appreciated that the location of the ICP 7 is fixed and known relative to one or more reference points.

The method advances to box 130 where the charging bay is enabled for use. This may include confirming that the motor vehicle is not stolen, obtaining payment details from the driver and activating one or more sensors associated with the charging bay.

The method advances from box 130 to box 140 where a required vehicle position is determined based upon the known position of the ICP 7 and the position of the VICP 6 on the motor vehicle obtained from the data associated with the registration mark of the motor vehicle as provided by reading the number plate. It will be appreciated that the data relating to each registration mark may be held in a central location and be access remotely by any known communication medium suitable for accessing such data such as, for example, a secure internet link.

The current position of the VICP 6 relative to the ICP 7 is also calculated or estimated based upon information received from one or more sensors. The distance and direction of travel required to move the motor vehicle from its current location to the required position for inductive charging is determined and, in box 150, guidance is given to the driver or, if the vehicle includes an automatic maneuvering system, to the vehicle in order to direct the motor vehicle to the required position.

When the required position has been attained, which may require several iterations of box 150, the method advances to box 160 and charging of one or more batteries of the motor vehicle commences.

The state of charge of each battery of the motor vehicle being charged is monitored during the charging process and, when a predefined level of charge is reached, charging is terminated as indicated in box 170. A bill for the electricity used is sent to the driver either directly to a mobile communications device such as a mobile telephone or as an electronic funds request to a bank account identified as being a valid bank account of the driver. The driver can at the same time be alerted either directly or remotely that charging has finished.

If the driver interrupts charging by moving the vehicle away from the charging bay before charging is complete the method will advance directly from box 160 to box 170 so as to charge for the electricity used during the relevant charging period.

Therefore by reading the number plate of a motor vehicle, relevant information is obtained regarding the position of a vehicle mounted inductive coupling point which is combined with knowledge regarding the position of a fixed inductive coupling point thereby enabling guidance to be provided to the motor vehicle for use in accurately positioning the motor vehicle and, in particular, the vehicle mounted inductive coupling point relative to the fixed inductive coupling point so as to maximize inductive charging efficiency.

One advantage may be that any vehicle can be accurately positioned without the need for the driver to directly see the fixed inductive coupling point or the position of the vehicle mounted inductive coupling point relative to the fixed inductive coupling point.

Therefore in summary, this disclosure proposes fitting a camera or device capable of number plate recognition to each parking bay so that an electrical parking bay charging system associated with the parking bay is able to identify the make and model of vehicle. This enables a database of vehicle specific coil configurations to be accessed so that the electrical parking bay charging system knows the location of the vehicle-coil with respect to one or more reference points on the vehicle. This information is used by an HMIM or other interface system to direct the driver to optimally position the vehicle over the ground located ICP.

In one embodiment, the parking bay markings comprise guide rails, similar to those found in an automatic car wash. This helps the driver to ensure the vehicle is correctly located above the ICP laterally.

In another embodiment, the parking bay markings could simply comprise painted lines. In this case, additional sensors would be required in order to identify the lateral position of the vehicle. This could be achieved for example by an array of sensors spread across the width of the parking bay so that the corners of the vehicle could be identified. This information could also be obtained from the camera or alternative sensor configurations, for example, by locating sensors along one or both edges of the parking bays.

In a further embodiment, the HMIM could transmit the positioning information to the vehicle and similar information to that displayed on the display screen could alternatively be displayed to the driver on a vehicle display device or mobile phone. This information could be transmitted via Bluetooth or any other suitable communication protocol.

Additionally, once a number plate of the vehicle has been read by the charging station, it could be linked to an automated payment system to quickly identify the owner of the vehicle. Whilst this would still have to have additional security measures in place to prevent drivers taking advantage of cloned number plates, it could form part of the process of driver identification for the purpose of payment.

It will be appreciated that examples described herein could be applied to home use and in such a case billing for the electricity need not be done if the fixed ICP is connected via a meter of the house or property.

Although this has been described by way of reference to a preferred embodiment in which the identity of the motor vehicle is obtained by reading a number plate because such identification means are widely used, it will be appreciated by those skilled in the art that the examples could also be enabled using some other form of vehicle recognition device such as, for example and without limitation, a RFID tag mounted on the motor vehicle and a RFID tag reader instead of a number plate recognition system.

"To align the single vehicle mounted inductive coupling point with the fixed ground mounted inductive coupling point" as meant herein means to align the two inductive coupling points sufficiently to enable an efficient inductive coupling to be achieved therebetween.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A charging apparatus comprising:
   a charger for supplying power to a ground inductive coupler;
   a recognition system for reading data from a tag on a vehicle and retrieving from memory a location, cross-referenced with the data, of an inductive coupler on the vehicle; and
   a processing system for generating output to guide positioning of the inductive coupler relative to the ground inductive coupler based on the location.

2. The apparatus of claim 1, wherein the tag is a vehicle number plate or license plate.

3. The apparatus of claim 1, wherein the tag is an RFID tag.

4. The apparatus of claim 1, wherein the processing system is further for sending the output to the vehicle.

5. The apparatus of claim 1, wherein the recognition system is a vision system.

6. A vehicle charging method comprising:
   responsive to reading data from a tag on a vehicle,
      retrieving from memory a location, cross-referenced with the data, of an inductive coupler on the vehicle, and
      generating output to guide positioning of the inductive coupler relative to a ground inductive coupler based on the location; and
   responsive to alignment of the vehicle and ground inductive coupler, powering the ground inductive coupler.

7. The method of claim 6 further comprising sending the output to the vehicle.

8. The method of claim 6, wherein the tag is a vehicle number plate or license plate.

9. The method of claim 6, wherein the tag is an RFID tag.

* * * * *